Aug. 12, 1958    G. P. REINTJES    2,846,867
CHAMBER LINING
Filed Sept. 8, 1953    2 Sheets-Sheet 1
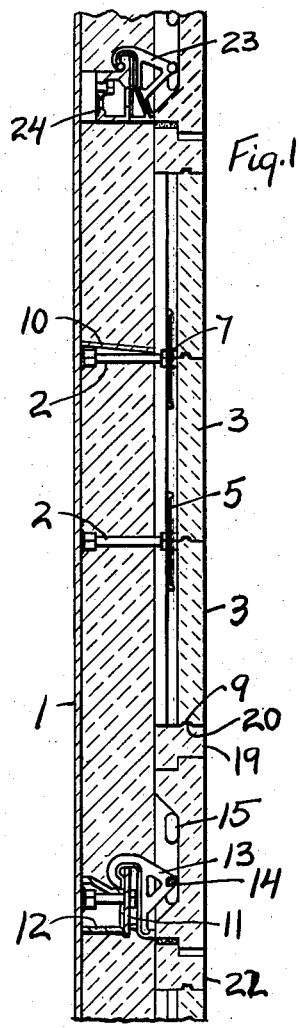
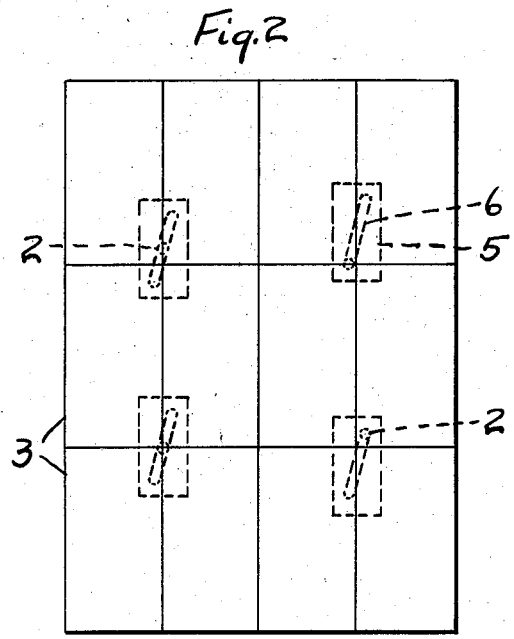
INVENTOR.
George P. Reintjes
BY Kenneth M. Thorpe
    atty.

Aug. 12, 1958  G. P. REINTJES  2,846,867
CHAMBER LINING
Filed Sept. 8, 1953  2 Sheets-Sheet 2
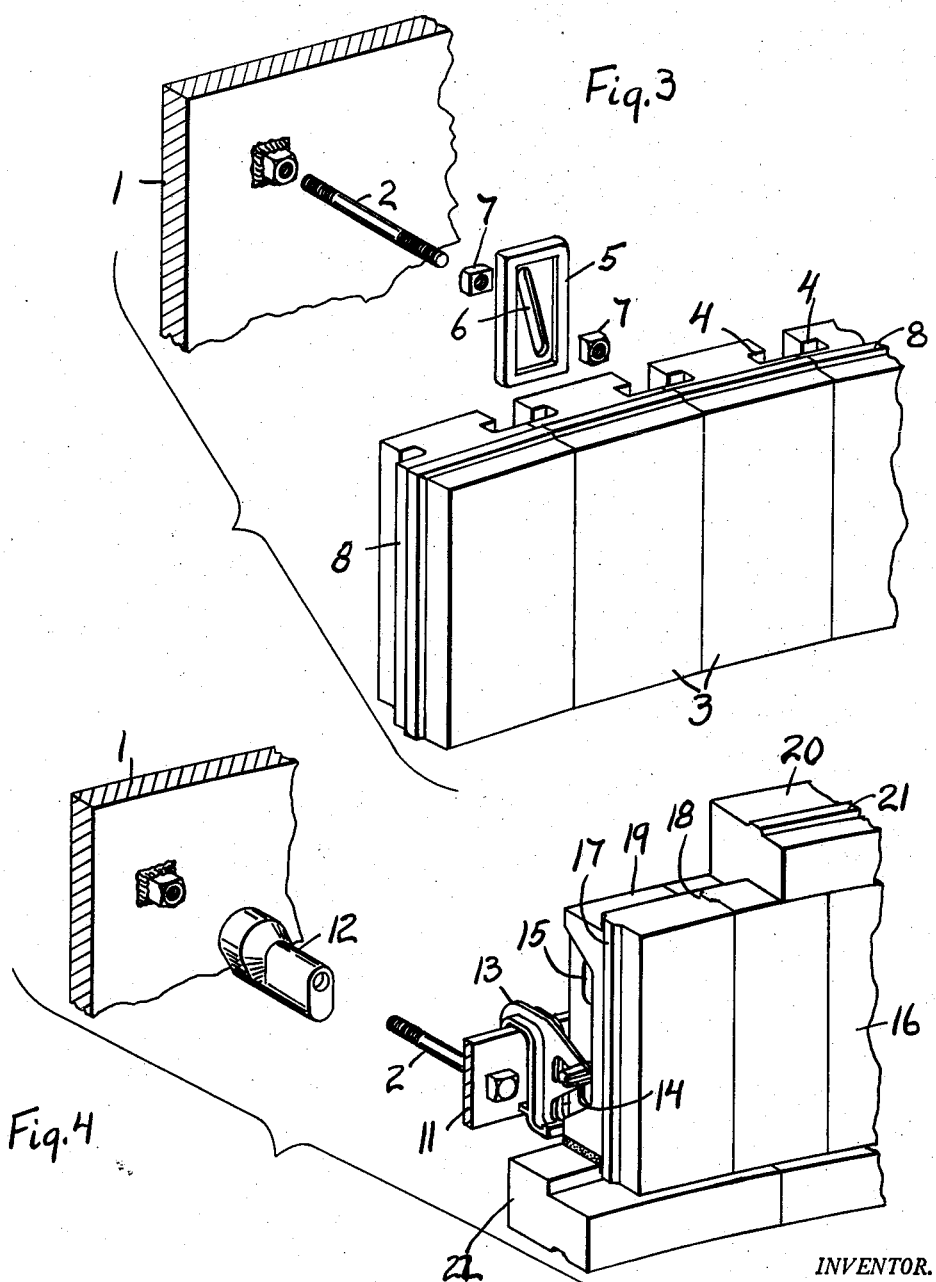
INVENTOR.
BY George P. Reintjes
Kenneth M. Thorpe
atty.

United States Patent Office 2,846,867
Patented Aug. 12, 1958

2,846,867

CHAMBER LINING

George P. Reintjes, Kansas City, Mo.

Application September 8, 1953, Serial No. 378,965

1 Claim. (Cl. 72—19)

This invention relates to chamber linings and is particularly adapted for use in catalyst towers, waste heat flues of cement mills and in other locations where a lining is desired which is resistant to plus or minus pressures and is unpenetrable to gases or eroding agents carried by such gases.

Another object of the invention is to produce a construction of the character indicated which readily lends itself to use with an insulating filler of solid, granular, fibrous or plastic form.

A further object of the invention is to produce a construction which provides continuous metal plates or estoppels to limit the extent of undercutting or scoring of the insulation should the gases pass through the lining into the insulation space.

A still further object is to provide a lining in which the tile are secured against displacement inward or outward of the chamber by a series of anchoring castings which are secured by bolts or studs to the wall or framework of the chamber, the construction being such that the bolts may be of irregular length to compensate for irregularities in the wall of the chamber but maintain the plane of the lining true or plumb. The support also is of such nature that misalinement of the bolts is compensated by a shifting of the anchor plates thereon.

With the general objects named in view and others as will hereinafter appear, the invention consists in certain new and useful features of construction and organization of parts as hereinafter described and claimed; and in order that it may be fully understood, reference is to be had to the accompanying drawings, in which:

Figure 1 is a cross section through a chamber lining embodying the invention.

Figure 2 is a fragmentary face view of the lining to illustrate compensation for misalined bolts or studs.

Figure 3 is an exploded view of the anchoring tile lining and anchoring bolts.

Figure 4 is an exploded view through the supporting tile and filler tile, together with the suspension means.

In the said drawings, where like reference characters identify corresponding parts in all of the drawings, 1 is the structural support member of the chamber and is representative of a concrete or masonry wall, a skeleton framework, a metal encasement or other structural arrangement. To secure the lining to the support a series of bolts, studs or the like 2 project inwardly from the support 1, and said bolts or studs are preferably arranged in alinement. However, in actual practice a very large tolerance must be made for variations in the alinement of the bolts, otherwise manufacturing and erection costs become prohibitive. It will also be noted that even if the plane of the support 1 is irregular or out of plumb, by adjusting the bolt or stud lengths this condition can be remedied as far as the lining is concerned.

The anchor or lining tile preferably comprise blocks 3 of suitable material depending on the conditions of the installation, said blocks having anchor flanges 4 accessible through their rear faces. In the present embodiment, the flanges are in the edges of the tile so that when a pair of tile are juxtaposed, their flanges cooperatively form a T-shaped slot. The tile 3 are tied to the studs or bolts by anchor plates 5 which are movable in relation to the studs as by providing diagonal through slots 6, so that said plates may be shifted on the studs as shown in dotted lines, Figure 2, to compensate for misalinement of the studs 2. The anchor plates 5 are located the desired distance from the structure 1 and the lining tile 3 are correspondingly positioned by locking the plates 5 by means of clamp nuts 7 or otherwise.

Where the chamber is subject to pressure or where a particularly tight lining is desired, the tile 3 may be formed on opposite edges with tongues and grooves 8 and 9. Also where insulation is to be used between the back of the anchored or lining tile and the chamber wall 1, as shown in Figure 1, estoppel plates 10 may be positioned on horizontal rows of studs or bolts 2. These impenetrable plates prevent unlimited gas travel and erosion of the insulation.

From a consideration of the above it will be apparent that the anchoring plates 5 function only to tie the lining 3 against inward or outward movement as they are not gravity load bearing elements. Therefore, where the lining is of considerable height it is desirable to provide belts of underlying supported tile or shelves which are suspended from the structural frame 1 of the chamber.

The supporting tile are illustrated as of two types in Figure 1. The lighter construction as shown in detail in Figure 4, readily lends itself to the lining of cylindrical chambers as it comprises a metal strap 11 which is carried by a horizontal row of bolts or studs 2 or otherwise supported in spaced relation from wall 1. In practice the studs 2 may be reinforced against bending by oval sleeves 12 which provides elongated abutments against the strap 11 and the wall 1. The strap 11 receives hook-on hangers 13 having side pintles 14 received within openings 15 in the support tile 16. The side edges of the tile 16 are preferably formed with tongues and grooves 17 and 18 respectively. The top and bottom edges of tile 16 are preferably reversely stepped at 19. On top of the row of support tile 16 is a row of spacer tile 20 having tongues 21 on their upper faces to be received within the grooves of the anchor tile 3.

As each belt of anchor tile is laid-up, it is completed by a row of cap or spacer tile 22 which provide an expansion joint underlying the superposed row of support tile 16. In some types of installation it may be desirable to have a continuous box casting 23, as the hanger support, rather than the spaced strap 11. This casting 23 acts as the support for a row of tile hangers 24. The balance of the construction is the same as that previously described.

From the above description it will be apparent that I have produced a construction embodying all of the features of advantage set forth as desirable, and which I have described and illustrated the preferred construction, it is to be understood that I reserve the right to all changes within the spirit and scope of the appended claim.

I claim:

A chamber lining comprising a supporting structure, a tile lining for said structure comprising a plurality of rows of identical abutting tile, each pair of adjacent tile having their abutting side edges formed with recessed flanges conjointly forming a T-shaped slot opening through the rear face of the tile, rows of spaced studs projecting in fixed relation from the supporting structure and having threaded ends received within the T-slots, rectangular anchor castings having their opposite longitudinal edges received within the recessed flanges of each pair of adjacent tile, said rectangular castings have a diagonal slot receiving the studs and permitting longitudinal and lateral displacement of the castings on the studs to compensate for misalinement of the T-slots in relation to the stud location, and clamp nuts threaded on the studs on opposite sides of the castings to secure said castings in fixed position on the studs.

References Cited in the file of this patent

UNITED STATES PATENTS

| | | |
|---|---|---|
| 325,009 | Peterson | Aug. 25, 1885 |
| 815,513 | Copeland | Mar. 20, 1906 |
| 2,143,280 | Reintjes | Jan. 10, 1939 |
| 2,144,597 | Reed et al. | Jan. 17, 1939 |
| 2,235,646 | Schaffer | Mar. 18, 1941 |
| 2,369,100 | Young | Feb. 6, 1945 |
| 2,601,631 | Reintjes | June 24, 1952 |
| 2,705,414 | Rose | Apr. 5, 1955 |
| 2,733,786 | Drake | Feb. 7, 1956 |

FOREIGN PATENTS

| | | |
|---|---|---|
| 581,758 | Great Britain | Oct. 23, 1946 |